United States Patent [19]

Nemoto et al.

[11] Patent Number: 5,640,989

[45] Date of Patent: Jun. 24, 1997

[54] FUEL CUT-OFF VALVE

[75] Inventors: Hideo Nemoto; Koichi Yoshihara, both of Fujisawa, Japan

[73] Assignee: NOK Corporation, Tokyo, Japan

[21] Appl. No.: 569,005

[22] Filed: Dec. 7, 1995

[30] Foreign Application Priority Data

Jan. 12, 1995 [JP] Japan .................... 7-018813
Aug. 3, 1995 [JP] Japan .................... 7-218059

[51] Int. Cl.⁶ .................................. F16K 17/36
[52] U.S. Cl. ................ 137/39; 137/202; 137/630.14
[58] Field of Search ................. 137/39, 43, 202, 137/630.14

[56] References Cited

U.S. PATENT DOCUMENTS 5,028,244 7/1991 Szlaga ..................... 55/170
5,044,389 9/1991 Gimby ..................... 137/39
5,261,439 11/1993 Harris ..................... 137/43

FOREIGN PATENT DOCUMENTS 2-112658 10/1988 Japan .

Primary Examiner—Stephen M. Hepperle
Attorney, Agent, or Firm—Jacobson, Price, Holman & Stern, PLLC

[57] ABSTRACT

A fuel cut-off valve (10) includes an enlarged-diameter vapor outlet aperture (30) which is controlled by a first closure member (50) having a small auxiliary vapor vent orifice (52) which, in turn, is controlled by a second closure member (58) formed on the float member (38). The first closure member (50) is biased by a spring (62) toward the second closure member (58) to ensure that the first closure member (50) is unseated away from the main valve seat (36) as soon as the auxiliary vapor vent orifice (52) is opened.

6 Claims, 5 Drawing Sheets

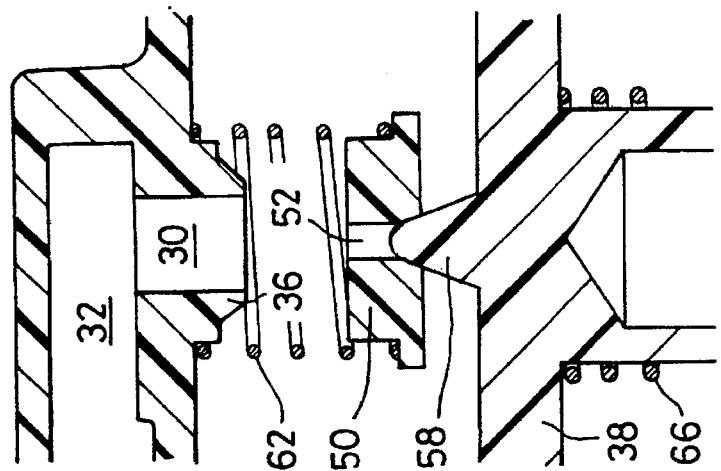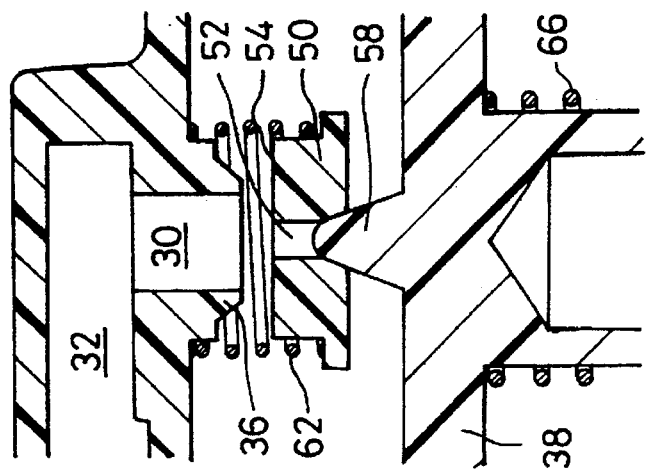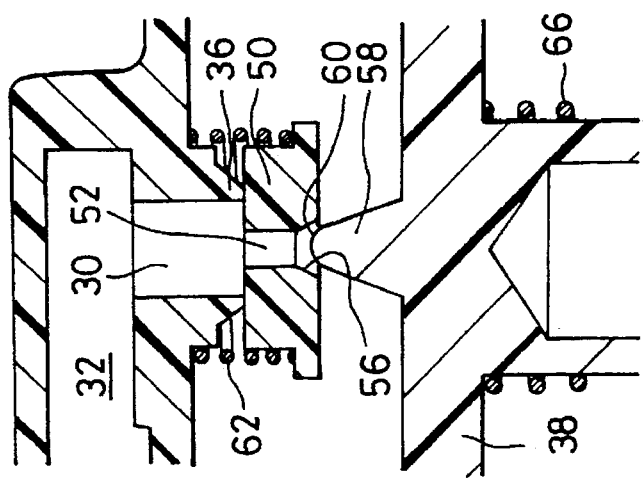

FUEL CUT-OFF VALVE

BACKGROUND OF THE INVENTION

1. Field of the Invention

The present invention relates broadly to evaporative emission control systems of automobiles. More specifically, the present invention is concerned with a fuel cut-off valve for preventing discharge of liquid fuel from a fuel tank while admitting release of fuel vapor.

2. Description of the Prior Art

Automobile fuel tank is generally connected through a vapor vent line to a charcoal canister to capture and recover fuel vapor generated in the fuel tank. In some types of fuel system, the vapor vent line also permits the fuel tank to breathe whenever the fuel tank headspace is subjected to a negative pressure. To prevent liquid fuel from leaking through the vapor vent line to the canister during jolting, tilting, cornering or roll-over of the automobile, a fuel cut-off valve is provided at the top of the fuel tank. This valve is also referred-to in the art as a roll-over valve.

A typical design of an earlier fuel cut-off valve is illustrated in FIGS. 9 and 10 of Japanese Patent Kokai Publication No. 2-112658. As shown therein, the earlier fuel cut-off valve has a small vapor vent orifice which is controlled by a valve member formed atop of a float member. When the liquid level in a float chamber is raised due to cornering of vehicle or for any other reasons, the float urges the valve member in contact with the vapor vent orifice to preclude leakage of liquid fuel. As the liquid level is then lowered, the float descends to re-open the valve member whereby communication between the tank headspace and the canister is resumed.

Generally, it has been the conventional practice to design the vapor vent orifice small enough to ensure that the valve member is readily unseated under the action of the gravity acting on the float member to re-open the vent orifice even in the event that a substantial pressure differential exists across the vent orifice due to the positive pressure that would prevail in the fuel tank headspace.

Recently, onboard refueling vapor recovery systems have been proposed to totally suppress or substantially reduce the emission of fuel vapor during refueling. In these systems, the fuel filler tube of the fuel tank and the fuel dispensing nozzle are sealed with each other to ensure that all fuel vapor in the fuel tank is forwarded to the canister throughout the refueling operation.

During refueling, fuel vapor present or generated in the tank is displaced as liquid fuel is dispensed into the tank. The flow rate of fuel vapor as displaced out of the fuel tank is equal to or even larger than the flow rate of the fuel dispenser which may attain, for example, 15–40 litters per minute. In order to smoothly discharge fuel vapor to the canister during refueling, it is desirable that the diameter of the vapor vent orifice of the fuel cut-off valve be made as large as possible. However, as the vapor vent orifice is enlarged, the effective cross-sectional area of the valve member of the fuel cut-off valve is correspondingly increased so that the valve member is subjected to a substantial pressure force if a pressure differential exists across the vapor vent orifice. Accordingly, once the valve member has closed, it tends to remain closed when it should be re-opened. This condition is referred-to in the art as "sticking" or "corking".

Various valve designs have been proposed to avoid corking. For example, Japanese Patent Kokai Publication No. 2-112658 cited above and Szlaga U.S. Pat. No. 5,028,244 propose use of a movable upper closure member which is separate from the float member and which is adapted to open and close the large-diameter vapor vent orifice. The upper or main closure member is provided therethrough with a second vapor vent orifice of a smaller diameter. The small-diameter second orifice is adapted to be controlled by a second or lower closure member integral with the float member.

The upper or main closure member is guided through a plurality of arms by the float member which, in turn, is guided by the valve body. The main closure member normally rests by gravity upon the float member. As the float is lifted, the main closure member is brought into engagement with the large-diameter main vapor vent orifice.

When re-opened, the lower second closure member is first disengaged from the main upper closure member which, in turn, is disengaged from the main valve seat. The main closure member is designed to be pulled down by the float member through a lost motion mechanism. To this end, each of the arms is provided at the lower end with a hook adapted to engage a flange or shoulder of the float member, the arrangement being such that the upper closure member is pulled down by the float to re-open the small-diameter orifice only when the float member has stroked down for a certain distance.

The advantage of this design is that the diameter of the main vapor vent orifice can be made larger so as to increase the flow rate of fuel vapor displaced from the tank to the canister during refueling.

However, the problem involved in this design is that, due to the presence of the lost motion mechanism, the responsiveness of the upper or main closure member is unsatisfactory to the extent that it is not re-opened until the float member has fully stroked. Under certain operating conditions wherein, for example, the vehicle repeats cornering or continues to run over a rough terrain so that the float member remains situated somewhat halfway of its stroke, the main closure member tends to stay closed. This would result in an excessive pressure rise in the fuel tank if the amount of fuel vapor generated due to agitation of liquid fuel or due to temperature exceeds the amount of fuel vapor released through the small-diameter second orifice.

Accordingly, an object of the present invention is to provide a fuel cut-off valve having an improved responsiveness.

Another object of the present invention is to provide a fuel cut-off valve which is capable of effectively releasing fuel vapor even under a condition wherein fuel vapor is vigorously generated.

Another problem associated with the conventional fuel cut-off valves cited above is that the axial guide for the main closure member is not positive. Because the main closure member simply rests by gravity upon the float member, it tends to bounce on the second or lower closure member when the vehicle vibrates. The main closure member is guided through a certain radial clearance by the float member which, in turn, is guided by the valve body through another additional radial clearance. Accordingly, the radial clearances to which the main closure member is subjected are two fold. As a consequence, there is a risk that the main closure member is tilted or offset from the main valve seat in response to vibration thereby resulting in an imperfect closure.

Accordingly, a still another object of the invention is to provide a fuel cut-off valve which has an improved sealing or shut-off capability.

SUMMARY OF THE INVENTION

According to the invention, the fuel cut-off valve includes a valve body defining a float chamber in communication with the headspace of the fuel tank. The valve body is formed with a vapor vent passage having a vapor outlet aperture opening into the top of the float chamber and has a main valve seat surrounding the vapor outlet aperture. A first closure member is arranged in the float chamber and is movable relative to the main valve seat to close the vapor outlet aperture upon engagement with the main valve seat. The first closure member has an auxiliary vapor vent orifice therethrough of a diameter smaller than the diameter of the vapor outlet aperture. A float member is movably received in the float chamber and is provided with a second closure member for closing the auxiliary vapor vent orifice upon engagement with the first closure member.

The feature of the invention is that the fuel cut-off valve comprises a coiled spring for biasing the first closure member away from the main valve seat toward the second closure member in such a manner that the first closure member is unseated away from the main valve seat when the second closure member is disengaged from the first closure member.

By the provision for the coiled spring, the first closure member is constantly brought into engagement with the second closure member as long as the first closure member is disengaged from the main valve seat. When the float member is lifted in response to a rise in the liquid level, the float member urges the first closure member, as engaged by the second closure member, against the main valve seat to shut-off the release of liquid fuel.

As the float member commences its downward stroke in response to lowering liquid level, the second closure member provided on the float member is first disengaged from the first closure member. As the second closure member quits the first closure member, fuel vapor begins to issue through the auxiliary vapor vent orifice. As soon as the spring force overcomes the force of pressure differential acting upon the first closure member, the first closure member is peeled away from the main valve seat under the action of the coiled spring and is brought into engagement with the second closure member. This permits fuel vapor to flow through the large-diameter main valve seat. In this manner, discharge of fuel vapor is commenced at the initial stage of the descending stroke of the float member to effectively relieve the fuel tank pressure.

In a preferred embodiment of the invention, the fuel cut-off valve includes a positive guide for guiding the first closure member axially with respect to the valve body as the first closure member moves to and away from the main valve seat. With this arrangement, the position of the first closure member is stabilized so that the first closure member snugly engages with the main valve seat to interrupt undesirable leakage of liquid fuel.

Preferably, the positive guide includes a wall arranged in part above the level of the main valve seat. This arrangement is advantageous in reducing the vertical size of the fuel cut-off valve.

These features and advantages of the invention as well as other features and advantages thereof will become apparent from the following description.

BRIEF DESCRIPTION OF THE DRAWINGS

FIGS. 4A, 4B and 4C are enlarged cross-sectional views of part of the fuel cut-off valve shown in FIGS. 1 and 3 and showing in sequence different positions of the first closure member, with FIG. 4A showing the first closure member in its fully closed position and the float member in the initial stage of its downward stroke, with FIG. 4B showing the first closure member disengaged away from the main valve seat and seated on the second closure member of the float member, with FIG. 4C showing the first closure member and the float member in the fully open position;

Throughout different drawings, similar parts and members are shown by like reference numerals.

DESCRIPTION OF THE PREFERRED EMBODIMENTS

Figure 1:
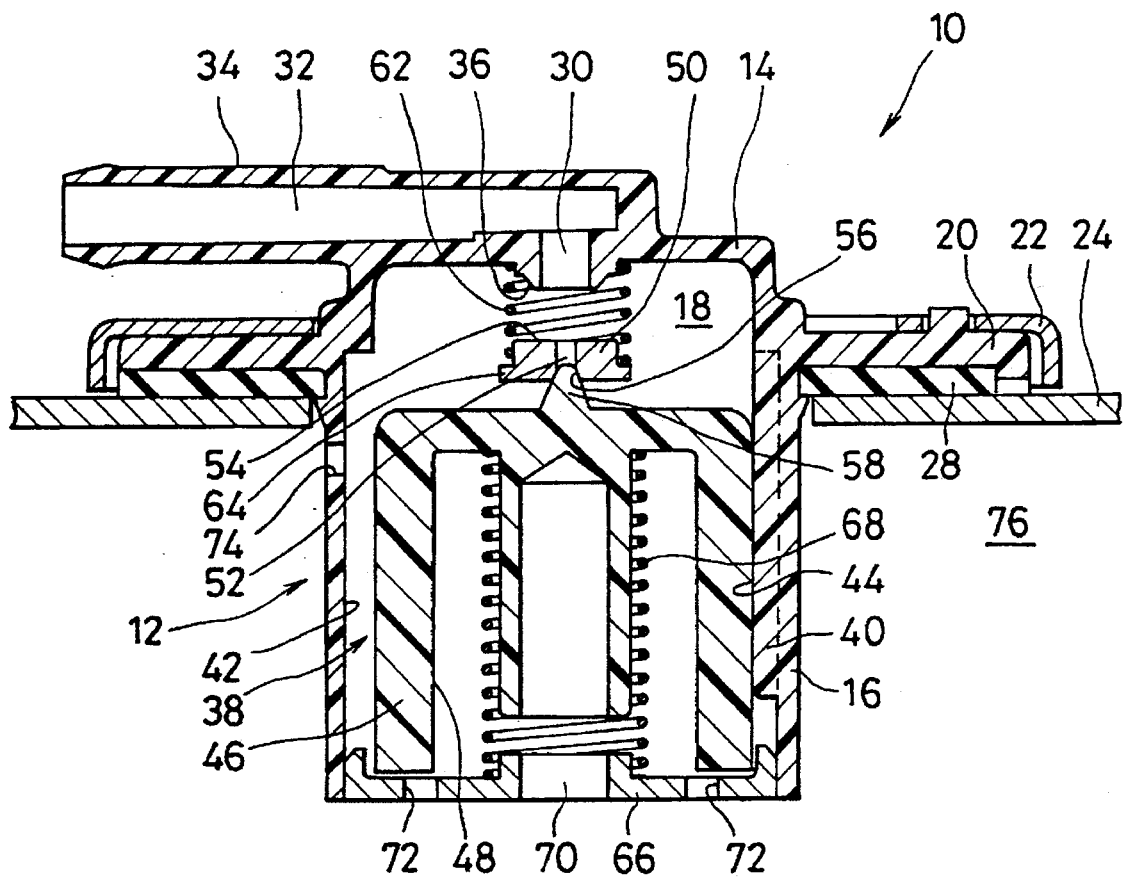
FIG. 1 is a cross-sectional view of the fuel cut-off valve according to the invention as mounted to a fuel tank, with the float member and the first closure member of the valve being shown as being in the fully open position.
Figure 2:
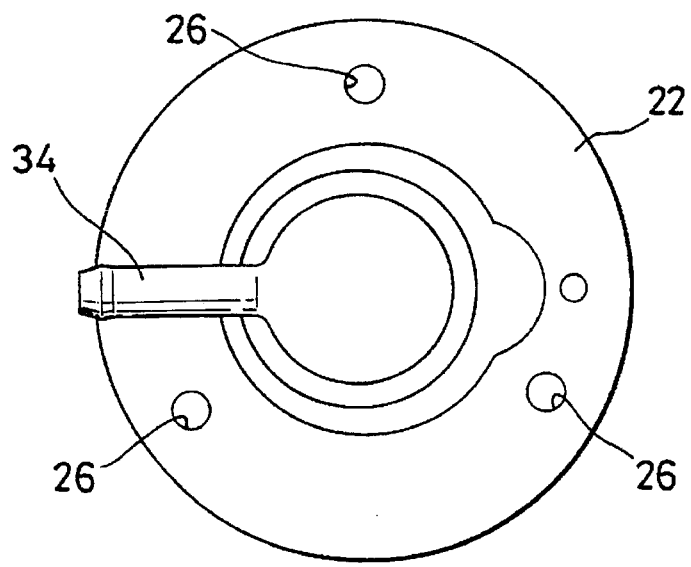
FIG. 2 is a top plan view of the fuel cut-off valve shown in FIG. 1.
Figure 3:
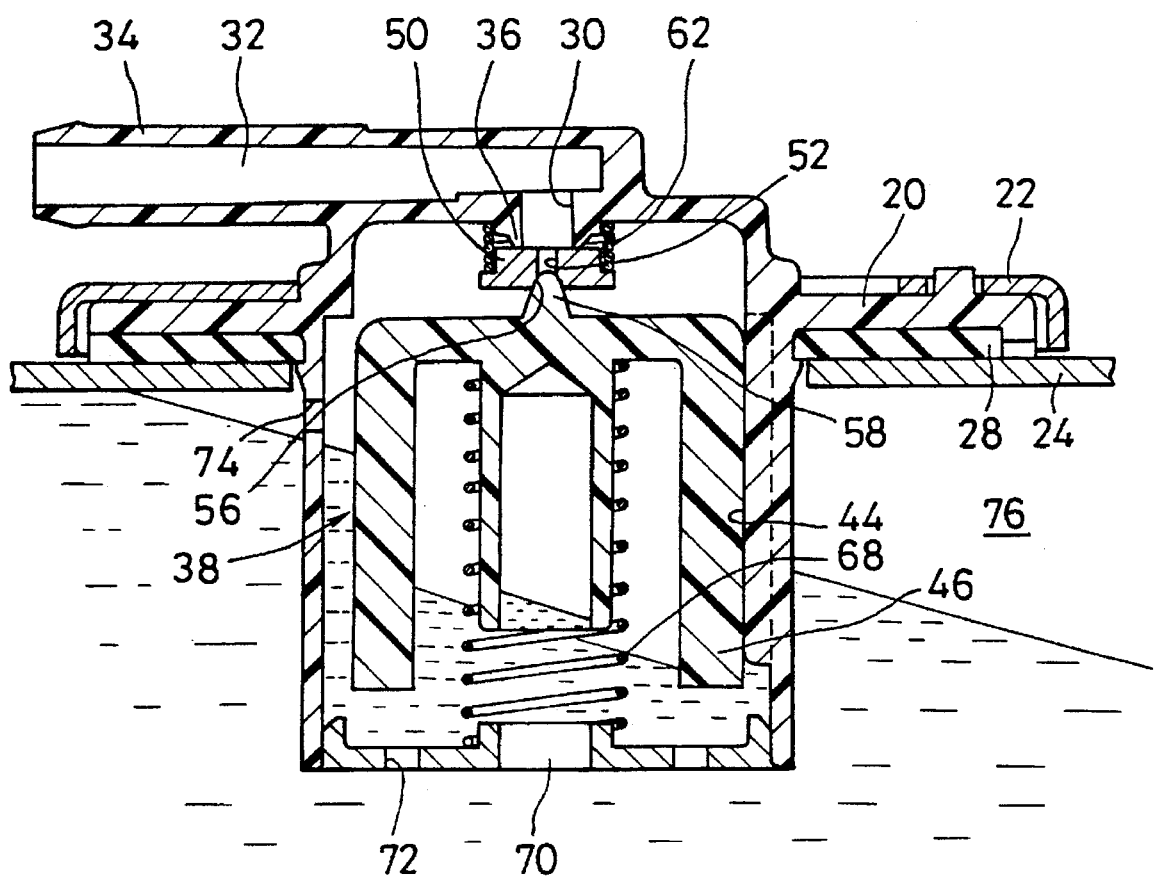
FIG. 3 is a view similar to FIG. 1 but showing the float member and the first closure member in their fully closed position.

Referring to FIGS. 1–3, the fuel cut-off valve, indicated generally by the reference numeral 10, includes a valve body 12 made, for example, of plastics such as polyacetal resins. The valve body 12 has a top wall 14 and a tubular side wall 16 which together define a generally cylindrical float chamber 18. The side wall 16 has an integral flange 20 covered by a metallic back-up plate 22. The fuel cut-off valve 10 may be mounted fluid tightly to the top of the fuel tank 24 by a suitable number of screws (not shown) screwed into holes 26 perforated through the back-up plate 22, the flange 20 and the fuel tank, with a sealing packing 28 sandwiched between the flange 20 and the tank 24.

The top wall 14 is formed with a vapor outlet aperture 30 coaxial with the float chamber 18. The vapor outlet aperture 30 is connected to a vapor vent passage 32 extending horizontally through a nipple section 34. A flexible vapor vent hose (not shown) is connected at an end to the nipple 34 and at the other end to a charcoal canister, not shown, to deliver fuel vapor generated in the fuel tank to the canister in a conventional manner. The top wall 14 is provided with an annular main valve seat 36 across which the vapor outlet aperture 30 opens into the float chamber 18.

A float assembly 38 is received within the float chamber 18 coaxially therewith. The float assembly 38 is axially guided by a plurality of vertically extending guide ribs, one of which is shown in FIG. 1 by the reference numeral 40. The guide ribs 40 are circumferentially equally spaced apart from each other and are arranged to project radially inwardly of the inner surface 42 of the tubular side wall 16. A small radial clearance is provided between the outer periphery of the float assembly 38 and the inner periphery 44 of the guide ribs 40 to ensure a smooth movement of the float assembly.

The float assembly 38 may also be made of polyacetal resins and has a float section 46 having a predetermined volume of displacement. In the illustrated embodiment, the float section 46 is formed with a central recess 48 which serves as an air trap and is open at its bottom to receive a coiled spring described later. However, the lower part of the central recess 48 may be closed to increase the buoyancy of the float section.

A first movable closure member 50 is arranged coaxially within the float chamber 18 between the main valve seat 36 and the float assembly 38 to control the vapor outlet aperture 30 in response to the movement of the float assembly 38. The first closure member 50 is formed therethrough with an auxiliary vapor vent orifice 52 having a diameter smaller than the diameter of the vapor outlet aperture 30. In the illustrated embodiment, the first closure member 50 is made in the form of a disc having a flat upper surface 54 engageable with the main valve seat 36. The first closure member 50 is formed with a conical valve seat 56 connected to and tapering toward the auxiliary vapor vent orifice 52.

The conical valve seat 56 is adapted to engage with a second closure member 58 projecting upwardly of and formed integral with the float assembly 38. The second closure member 58 has a part-spherically rounded outer surface 60 to ensure that when the first closure member 50 is brought into engagement with the second closure member 58 the first closure member 50 is self-aligned with the second closure member 58 even in the event that the first closure member 50 is radially offset from the second closure member 58 as well as to ensure that when the first closure member 50 is seated upon the second closure member 58 a fluid tight engagement is established therebetween even in the event that the first closure member 50 is tilted with respect to the axis of the second closure member 58.

The first closure member 50 is constantly biased downwards toward the second closure member 58 by a first compression coiled spring 62 arranged between the top wall 14 and a flange 64 of the first closure member 50. The spring constant and the preload of the first spring 62 are selected such that the spring force overcomes a predetermined differential pressure force acting upon the first closure member 50 when the vapor outlet aperture 30 is closed by the first closure member 50 and when the second closure member 58 is unseated from the first closure member 50 to open the auxiliary vapor vent orifice 52 as shown in FIG. 4A.

The lower end of the float chamber 18 is closed by a bottom plate 66 suitably affixed to the lower end of the side wall 16 of the valve body. A second compression coiled spring 68 is arranged between the float assembly 38 and the bottom plate 66 to upwardly bias the float assembly 38.

The bottom plate 66 of the valve body 12 is formed with a central opening 70 and a plurality of outer openings 72 to admit liquid fuel to flow into and out of the float chamber 18 in response to a change in the liquid level in the fuel tank 24. The side wall 16 is provided at its upper part with a plurality of apertures 74 which communicates the headspace 76 of the fuel tank with the upper part of the float chamber 18.

The second spring 68 has much a stronger spring force than the first spring 62. The spring constant and the preload of the second spring 68 are selected such that the spring force of the second spring 68 is overcome by the total weight of the float assembly 38 and the first closure member 50 plus the spring force of the first spring 62 to permit the float assembly 38 to rest upon the bottom plate 66 as shown in FIG. 1 when the float chamber 18 is free from liquid fuel and such that the float assembly 38 urges the first closure member 50 into contact with the main valve seat 36 against the action of the first spring 62 as shown in FIG. 3 when the float assembly 38 is subjected to a predetermined force of buoyancy resulting from the liquid level being elevated close to the upper apertures 74 due to, for example, cornering of the vehicle.

In use, the liquid level in the fuel tank 24 is situated below the bottom plate 66 in a stable condition of the vehicle even when the fuel tank is fully charged with fuel, so that the float assembly 38 is seated on the bottom plate 66 as shown in FIG. 1 whereby the first closure member 50 is disengaged from the main valve seat 36 under the action of the first spring 62 and is brought into engagement with the second closure member 58 as shown in FIGS. 1 and 4C. In this state, the vapor outlet aperture 30 is fully opened to permit fuel vapor to be smoothly discharged to the canister.

As the float assembly 38 is subjected to vibration or splash of liquid fuel, it will move up and down together with the first closure member 50. During such movement, the first closure member 50 is resiliently held in contact with the second closure member 58 by the first spring 62 which prevent the first closure member 50 from bouncing away from the second closure member 58.

When the liquid level at the valve 10 is raised as shown in FIG. 3 due to cornering or for any reasons, the float assembly 38 brings the first closure member 50 into engagement with the main valve seat 36. If the first closure member 50 is tilted with respect to the main valve seat 36, the first closure member 50 will rotate about the part-spherical outer surface 60 of the second closure member 58 upon contact with the valve seat 36 so that the upper surface 54 of the first closure member 50 snugly engages with the main valve seat 36 to close the vapor outlet aperture 30. In this position, the first closure member 50 will be subjected to the differential pressure force acting on the cross-sectional area of the vapor outlet aperture 30.

As soon as the second closure member 58 is unseated from the conical valve seat 56 of the first closure member 50 to open the auxiliary vapor vent orifice 52 as shown in FIG. 4A in response to the commencement of the down stroke of the float assembly 38 resulting from lowering liquid level, fuel vapor starts to issue through the auxiliary vapor vent orifice 52. This triggers a slight pressure drop in the vapor pressure in the float chamber 18 so that the differential pressure acting across the auxiliary vapor vent orifice 52 is reduced. Moreover, the reduced differential pressure acts only upon the cross-sectional area of the vapor outlet aperture 30 minus the cross-sectional area of the auxiliary vapor vent orifice 52.

When the spring force of the first spring 62 overcomes the decreasing differential pressure force, the first closure member 50 is disengaged away from the main valve seat 36 under the action of the first spring 62 and is brought into engagement with the second closure member 58 as shown in FIG. 4B whereupon release of fuel vapor through the vapor outlet aperture 30 is restarted. In this way, release of fuel vapor is commenced at the early stage of the downward stroke of the float assembly The above sequence of closure and re-opening of the first closure member 50 will be repeated in a prompt manner as long as the float assembly 38 repeats its up and down movement as it is suspended closely to the fully lifted position. When the first closure member 50 is peeled away from the main valve seat 36 and is urged against the second closure member 58 as shown in FIG. 4B, the first closure member 50 will be self-aligned with respect to the second closure member 58 due to the conical valve seat 56 engaging the rounded outer surface 60 of the second closure member.

As liquid fuel is discharged from the float chamber 18 in response to lowering of the liquid level, the float assembly 38 will descend to fully open the vapor outlet aperture 30 as shown in FIGS. 1 And 4C.

Figure 5:
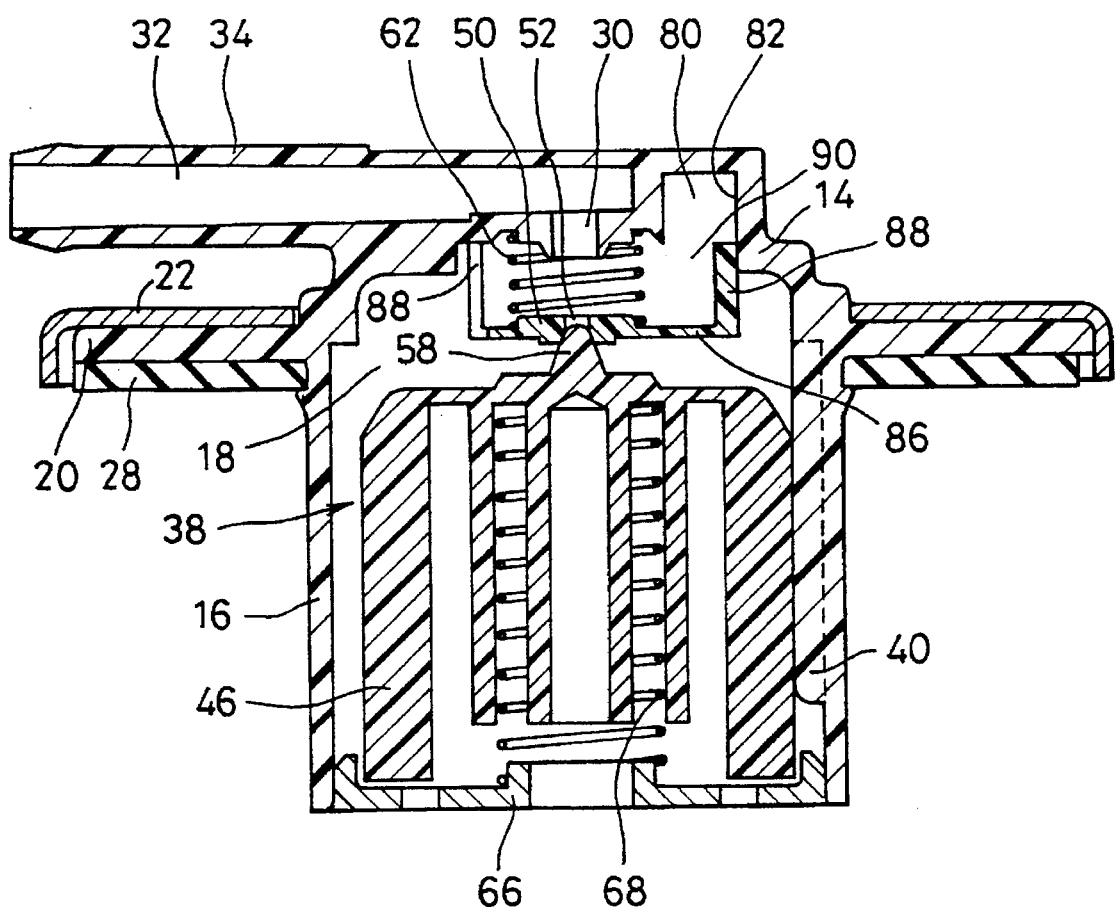
FIG. 5 is a view similar to FIG. 1 but showing the fuel cut-off valve according to the modified embodiment of the invention; and, FIG. 6 is an exploded perspective view of the fuel cut-off valve shown in FIG. 5, with the valve being shown inverted and the valve body being partly cut away to show the interior thereof.
Figure 6:
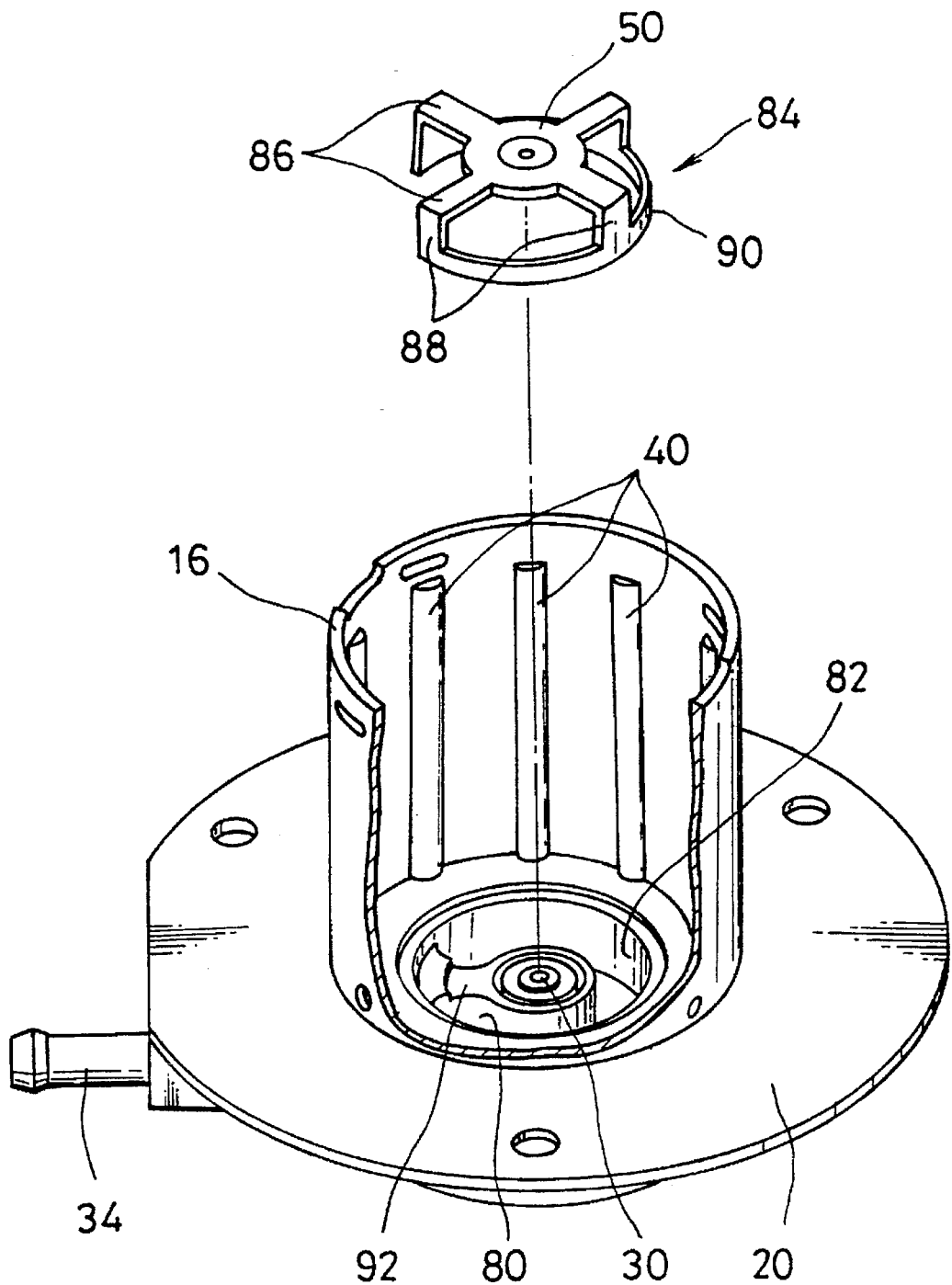

In FIGS. 5 and 6, there is shown a modified embodiment of the fuel cut-off valve of the invention. Parts and members similar to those of the foregoing embodiment are indicated by like reference numerals and, therefore, will not be described again. To describe only the difference, the feature of the modified embodiment is that it is provided with a guide mechanism for axially guiding the first closure member 50.

Referring to FIGS. 5 and 6, the top wall 14 of the valve body 12 is provided with a C-shaped recess 80 coaxial with the vapor outlet aperture 30 and formed in part above the level of the main valve seat 36. As best shown in FIG. 6, the opposite ends of the C-shaped recess 80 are spaced apart from one another and terminate before the horizontal vapor vent passage 32 on both sides thereof. The C-shaped recess 80 defines a part-cylindrical inner guide wall 82.

A movable valve assembly 84 incorporating the first closure member 50 is slidably fitted within the recess 80. The valve assembly 84 includes a certain number, e.g., four, of radial arms 86 each of which is connected to an axially extending guide arm 88 closely mating with the inner wall 82 of the recess 80. The axial arms 88 are connected with each other by a reinforcement ring 90. Similar to the recess 80, the reinforcement ring 90 is C-shaped to avoid interference with a part 92 of the top wall 14 in which extends the vapor vent passage 32.

With this arrangement, the first closure member 50 is positively guided with respect to the valve body 12 by the guide arms 88 slidingly engaged with the inner wall 82 of the recess 80 so that the position of the first closure member 50 is stabilized. The vertical space available between the level of the main valve seat 36 and the level of the vapor vent passage 32 is effectively utilized to form the recess 80 defining the inner guide wall 82.

While the present invention has been described herein with reference to the specific embodiments thereof, it is contemplated that the invention is not limited thereby and various modifications and alterations may be made therein without departing from the scope of the invention.

What we claim is:

1. A fuel cut-off valve for preventing discharge of liquid fuel from an automobile fuel tank and admitting release of fuel vapor therefrom, said valve comprising:

a valve body defining a float chamber in communication with the headspace of the fuel tank, said valve body being formed with a vapor vent passage having a vapor outlet aperture opening into the top of said float chamber, said valve body having a main valve seat formed at the upstream end of said vapor outlet aperture;

a first closure member arranged in said float chamber and movable relative to said main valve seat to close said vapor outlet aperture upon engagement with said main valve seat, said first closure member having an auxiliary vapor vent orifice therethrough of a diameter smaller than the diameter of said vapor outlet aperture;

a float member movably received in said float chamber, said float member having a second closure member for closing said auxiliary vapor vent orifice upon engagement with said first closure member; and, spring means for biasing said first closure member away from said main valve seat toward said second closure member in such a manner that said first closure member is unseated away from said main valve seat when said second closure member is disengaged from said first closure member.

2. A fuel cut-off valve according to claim 1, further comprising positive guide means for positively guiding said first closure member axially with respect to said valve body as said first closure member moves to and away from said main valve seat.

3. A fuel cut-off valve according to claim 2, wherein said positive guide means includes a part-cylindrical inner wall defined by said valve body and coaxial with the axis of said valve body, said inner wall being arranged in part above the level of said main valve seat.

4. A fuel cut-off valve according to claim 3, wherein said positive guide means includes a plurality of axially extending guide arms integral with said first closure member and cooperating with said inner wall.

5. A fuel cut-off valve according to claim 1, wherein said second closure member has a rounded outer surface and wherein said first closure member has a conical valve seat facing said rounded outer surface of said second closure member and connected to said auxiliary vapor vent orifice, said first closure member having a flat surface facing said main valve seat of said valve body.

6. A fuel cut-off valve according to claim 1, further comprising a second spring for biasing said float member to bring said first closure member as engaged with said second closure member into engagement with said main valve seat.

* * * * *